United States Patent
Oshins et al.

(10) Patent No.: US 8,700,816 B2
(45) Date of Patent: *Apr. 15, 2014

(54) CONFIGURATION SPACE VIRTUALIZATION

(75) Inventors: Jacob Oshins, Seattle, WA (US); Brandon Allsop, Monroe, WA (US); Andrew John Thornton, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 4 days.

This patent is subject to a terminal disclaimer.

(21) Appl. No.: 13/368,770

(22) Filed: Feb. 8, 2012

(65) Prior Publication Data

US 2012/0144071 A1 Jun. 7, 2012

Related U.S. Application Data

(63) Continuation of application No. 12/245,543, filed on Oct. 3, 2008, now Pat. No. 8,117,346.

(51) Int. Cl.
*G06F 3/00* (2006.01)

(52) U.S. Cl.
USPC .......... 710/11; 710/8; 710/9; 710/10; 710/12; 710/13; 710/14

(58) Field of Classification Search
None
See application file for complete search history.

(56) References Cited

U.S. PATENT DOCUMENTS

| | | | |
|---|---|---|---|
| 6,049,671 A | 4/2000 | Slivka et al. | |
| 6,611,912 B1 | 8/2003 | Maleck et al. | |
| 6,629,157 B1 | 9/2003 | Falardeau et al. | |
| 6,640,278 B1 * | 10/2003 | Nolan et al. | 711/6 |
| 6,820,164 B2 | 11/2004 | Holm et al. | |
| 7,036,122 B2 | 4/2006 | Bennett et al. | |
| 7,107,382 B2 | 9/2006 | Clayton | |
| 7,146,482 B2 | 12/2006 | Craddock et al. | |
| 7,149,789 B2 * | 12/2006 | Slivka et al. | 709/219 |
| 7,155,553 B2 | 12/2006 | Lueck et al. | |
| 7,234,037 B2 | 6/2007 | Errickson et al. | |
| 7,308,511 B2 | 12/2007 | Wilson et al. | |
| 7,356,686 B2 | 4/2008 | Nakajima | |
| 7,366,849 B2 | 4/2008 | Poisner | |
| 7,552,436 B2 | 6/2009 | Brice et al. | |
| 7,613,847 B2 * | 11/2009 | Kjos et al. | 710/22 |
| 7,689,755 B2 * | 3/2010 | Balasubramanian et al. | 710/311 |
| 7,716,035 B2 | 5/2010 | Oshins et al. | |

(Continued)

OTHER PUBLICATIONS

Tien et al., "How Virtualization Makes Power Management Different," http://www.kernel.org/doc/ols/2007/ols2007v1-pages-205-214.pdf, downloaded 2008, 205-214.

(Continued)

*Primary Examiner* — Henry Tsai
*Assistant Examiner* — Jing-Yih Shyu
(74) *Attorney, Agent, or Firm* — John Jardine; Andrew Sanders; Micky Minhas

(57) ABSTRACT

Various aspects are disclosed herein for bounding the behavior of a non-privileged virtual machine that interacts with a device by creating a description of the device which indicates to a privileged authority (1) which operations on the device may have system-wide effects and (2) which operations have effects local to the device. The privileged authority may then permit or deny these actions. The privileged authority may also translate these actions into other actions with benign consequences.

19 Claims, 12 Drawing Sheets

(56) References Cited

U.S. PATENT DOCUMENTS

| | | | |
|---|---|---|---|
| 7,739,417 B2 | 6/2010 | Liu et al. | |
| 7,814,240 B2* | 10/2010 | Salgado et al. | 710/15 |
| 7,904,914 B2* | 3/2011 | Green et al. | 719/321 |
| 8,117,346 B2 | 2/2012 | Oshins et al. | |
| 2003/0187904 A1 | 10/2003 | Bennett et al. | |
| 2003/0188122 A1 | 10/2003 | Bennett et al. | |
| 2006/0241930 A1 | 10/2006 | Oshins et al. | |
| 2006/0259292 A1 | 11/2006 | Solomon et al. | |
| 2007/0006178 A1 | 1/2007 | Tan | |
| 2007/0016895 A1 | 1/2007 | Tan | |
| 2007/0044100 A1 | 2/2007 | Panesar et al. | |
| 2007/0156986 A1 | 7/2007 | Neiger et al. | |
| 2007/0300223 A1 | 12/2007 | Liu | |
| 2008/0005297 A1* | 1/2008 | Kjos et al. | 709/223 |
| 2008/0040526 A1 | 2/2008 | Suzuki et al. | |
| 2008/0052431 A1 | 2/2008 | Freking et al. | |
| 2008/0077917 A1 | 3/2008 | Chen et al. | |
| 2008/0147925 A1 | 6/2008 | Brahmaroutu | |
| 2008/0148005 A1 | 6/2008 | Moertl et al. | |
| 2008/0294808 A1 | 11/2008 | Mahalingam et al. | |
| 2009/0044187 A1 | 2/2009 | Smith et al. | |
| 2009/0133028 A1 | 5/2009 | Brown et al. | |
| 2009/0165117 A1 | 6/2009 | Brutch et al. | |
| 2009/0307702 A1 | 12/2009 | Watkins | |
| 2010/0083276 A1* | 4/2010 | Green et al. | 719/313 |

OTHER PUBLICATIONS

"Intel Virtualization Technology," http://www.intel.com/technology/itj/2006/v10i3/2-io/4- virtualization-techniques.htm, 2006, vol. 10 Issue 03, 1-8.

International Patent Application No. PCT/US2009/059105: International Search Report Dated May 14, 2010, 10 pages.

* cited by examiner

172

174

Software Application

176

Guest Operating System

178

Guest Hardware Architecture
(Partition / Virtual Machine)

180

Virtualization Program
(Hypervisor / Virtual Machine Monitor)

182

Physical Hardware Architecture

FIG. 1B

CONFIGURATION SPACE VIRTUALIZATION

CROSS-REFERENCE

This application is a continuation of U.S. application Ser. No. 12/245,543, filed Oct. 3, 2008, now U.S. Pat. No. 8,117,346, which is hereby incorporated by reference in its entirety.

TECHNICAL FIELD

The presently disclosed subject matter relates to the field of computing, and more particularly, to computer virtualization, although virtualization is merely an exemplary and non-limiting field.

BACKGROUND

Most input/output (I/O) devices are designed with the assumption that there exists one piece of trusted software that configures all of the I/O devices in the system. It is also typically assumed that those I/O devices are ultimately controlled by device drivers that are plug-in modules that abstract individual device differences. Furthermore, it is assumed that these drivers are all contained within a single kernel.

However, in the context of virtual machines, the above assumptions may no longer be valid. Each virtual machine typically contains its own operating system kernel, which may or may not be trusted by all the other kernels running in all the other virtual machines. Configuring and controlling the devices within a physical host typically involves some central authority that has the ability to enforce policies regarding how actions from one virtual machine may affect other virtual machines. In some systems, this central authority lies in a host operating system. In other systems the authority may lie in a hypervisor, and in yet others, the authority may lie with one of the virtual machines running on top of a hypervisor.

When building a virtualization system, one approach may be to maintain complete control of all I/O devices within the above described central authority. Thus when a virtual machine needs I/O services, the virtual machine may pass a request (directly or indirectly) to the central authority that controls the I/O. This approach may work but suffers from two problems. First, the I/O operates more slowly than it would compared with an operating system running on physical hardware rather than a virtual machine. Second, the range of I/O devices expressed to the virtual machines may be limited by the virtualization software. It would be desirable to assign each of the devices within a physical computer to one or more of the virtual machines running within it. In this way, the I/O would not suffer the performance penalty associated with indirection and any device which can be plugged into the computer may be used by a virtual machine without requiring that the virtualization layers completely understand its internal function.

Accordingly, other techniques are needed in the art to solve the above described problems.

SUMMARY

Various methods and systems are disclosed herein for bounding the behavior of a non-privileged virtual machine (a virtual machine that does not own a system-wide policy for the device) that interacts with a device by creating or receiving a description of the device that indicates to a privileged authority (e.g., a hypervisor or other privileged aspect of a virtualization system) (1) which operations on the device may have system-wide effects and (2) which operations have effects local to the device. The privileged authority may then permit or deny these actions. The privileged authority may also translate these actions into other actions with benign consequences.

In an embodiment, for each device, a map of configuration space may be constructed, wherein each bit within the configuration may have one or more of the following properties:
 i. Read-only.
 ii. Always-0 on read.
 iii. Always-1 on read.
 iv. Read-write.
 v. Write of 1 clears, write of 0 leaves alone.
 vi. Write of 1 sets, write of 0 leaves alone.
 vii. Write of 0 clears, write of 1 leaves alone.
 viii. Write of 0 sets, write of 1 leaves alone.
 ix. Clear to 0 after first read.
 x. Set to 1 after first read.

The above behaviors are exemplary, and additional behaviors may be included to bound the actions allowed on memory locations. A map of MMIO space may also be constructed, wherein each page may be mapped into the virtual machine. For pages that are excluded from the virtual machine's map, the privileged authority may choose to populate that page with a static image that looks like the device. Alternatively, the privileged authority may choose to receive intercepts and handle the intercepts using configuration space with a map applied for these specific pages.

In further embodiments, a method for exchanging information for safely containing a device is disclosed. In some embodiments a representation of the maps can be embedded in a driver installation file. The installation files may be digitally signed by the party that produces them. Accordingly, a machine administrator may allow the privileged authority to process the installation files without actually installing a driver for the device in the privileged authority. The driver can be installed in the virtual machine and the device may be functional in the virtual machine and contained so that the device does not affect other virtual machines or the privileged authority.

In addition to the foregoing, other aspects are described in the claims, drawings, and text forming a part of the present disclosure. It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

It should be noted that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are illustrated. However, the disclosure is not limited to the specific aspects shown. The following figures are included:

FIG. 1B illustrates a diagram representing the logical layering of the hardware and software architecture for a virtualized environment in a computer system;

FIG. 5 is an exemplary diagram illustrating an address space that RAM may reside in;

DETAILED DESCRIPTION OF ILLUSTRATIVE EMBODIMENTS

Virtual Machines In General Terms

Certain specific details are set forth in the following description and figures to provide a thorough understanding of various embodiments of the invention. Certain well-known details often associated with computing and software technology are not set forth in the following disclosure to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

It should be understood that the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Figure 1A:
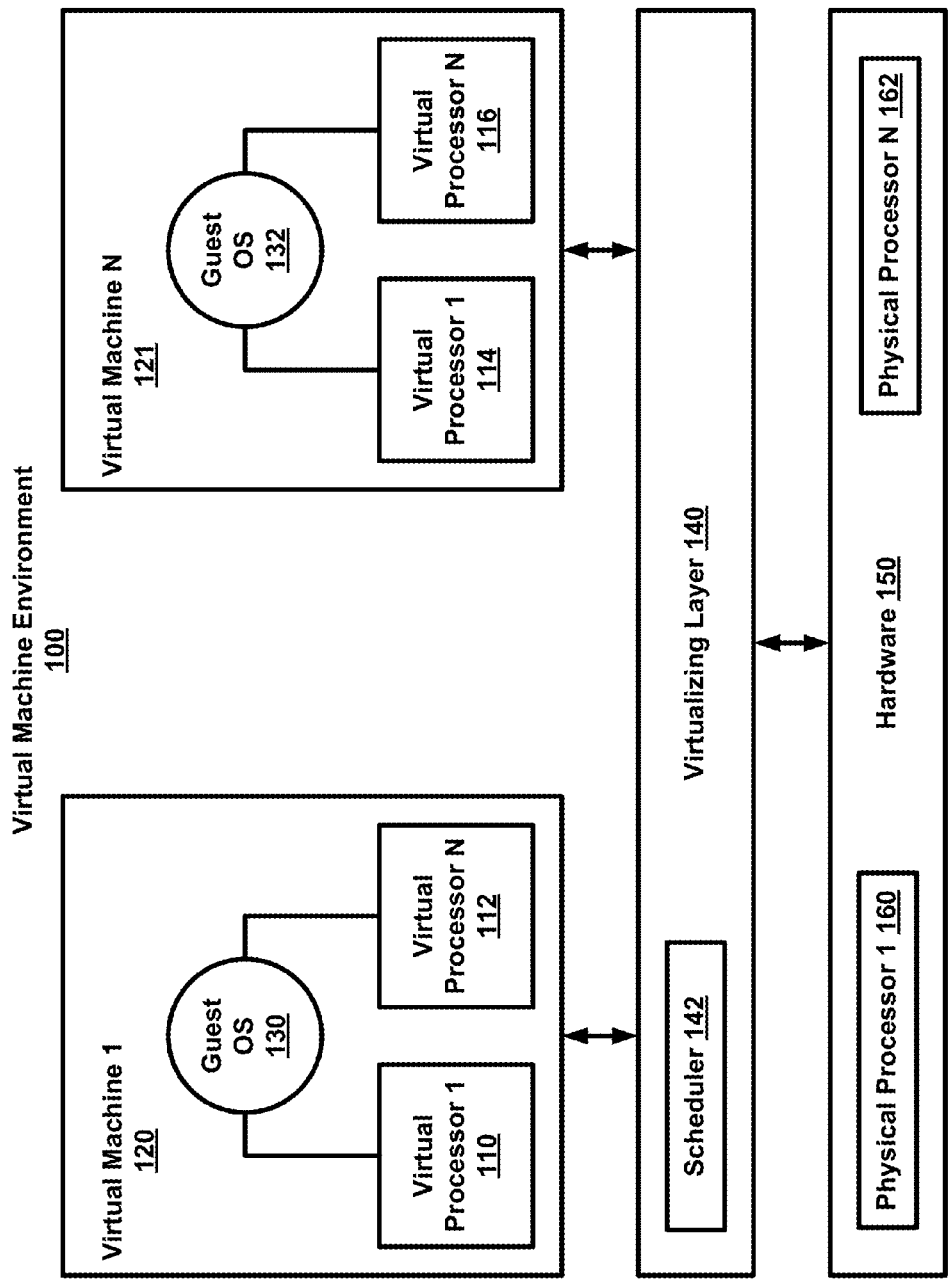
FIG. 1A illustrates a virtual machine environment, with a plurality of virtual machines, comprising a plurality of virtual processors and corresponding guest operating systems; the virtual machines are maintained by a virtualizing layer which may comprise a scheduler and other components, where the virtualizing layer virtualizes hardware for the plurality of virtual machines.

FIG. 1A illustrates a virtual machine environment 100, with a plurality of virtual machines 120, 121, comprising a plurality of virtual processors 110, 112, 114, 116, and corresponding guest operating systems 130, 132. The virtual machines 120, 121 are maintained by a virtualizing layer 140 which may comprise of a scheduler 142 and other components (not shown), where the virtualizing layer 140 virtualizes hardware 150 for the plurality of virtual machines 120, 121. The plurality of virtual processors 110, 112, 114, 116 can be the virtual counterparts of underlying hardware physical processors 160, 162.

FIG. 1B is a diagram representing the logical layering of the hardware and software architecture for a virtualized environment in a computer system. In FIG. 1B, a virtualization program 180 runs directly or indirectly on the physical hardware architecture 182. The virtualization program 180 may be (a) a virtual machine monitor that runs alongside a host operating system, (b) a host operating system with a hypervisor component, where the hypervisor component performs the virtualization, (c) hardware, or (d) micro-code. The virtualization program may also be a hypervisor which runs separately from any operating system. In other words, the hypervisor virtualization program need not run as part of any operating system, and need not run alongside any operating system. The hypervisor virtualization program may instead run "under" all the operating systems, including the "root partition." The virtualization program 180 virtualizes a guest hardware architecture 178 (shown as dashed lines to illustrate the fact that this component is a "partition" or a "virtual machine"), that is, hardware that does not actually exist but is instead virtualized by the virtualizing program 180. A guest operating system 176 executes on the guest hardware architecture 178, and a software application 174 can run on the guest operating system 176. In the virtualized operating environment of FIG. 1B, the software application 174 can run in a computer system even if the software application 174 is designed to run on an operating system that is generally incompatible with a host operating system and the physical hardware architecture 182.

A virtual machine typically contains an entire operating system and a set of applications, which together constitute many processes, the entirety of which may be referred to as "workload" or "process" in the context of virtual machines. In the present disclosure the terms "process" and "workload" may be used interchangeably in the context of virtual machines, and those skilled in the art will readily understand that "process" may refer to multiple processes including all of systems and applications that may be instantiated in a virtual machine.

Figure 2:
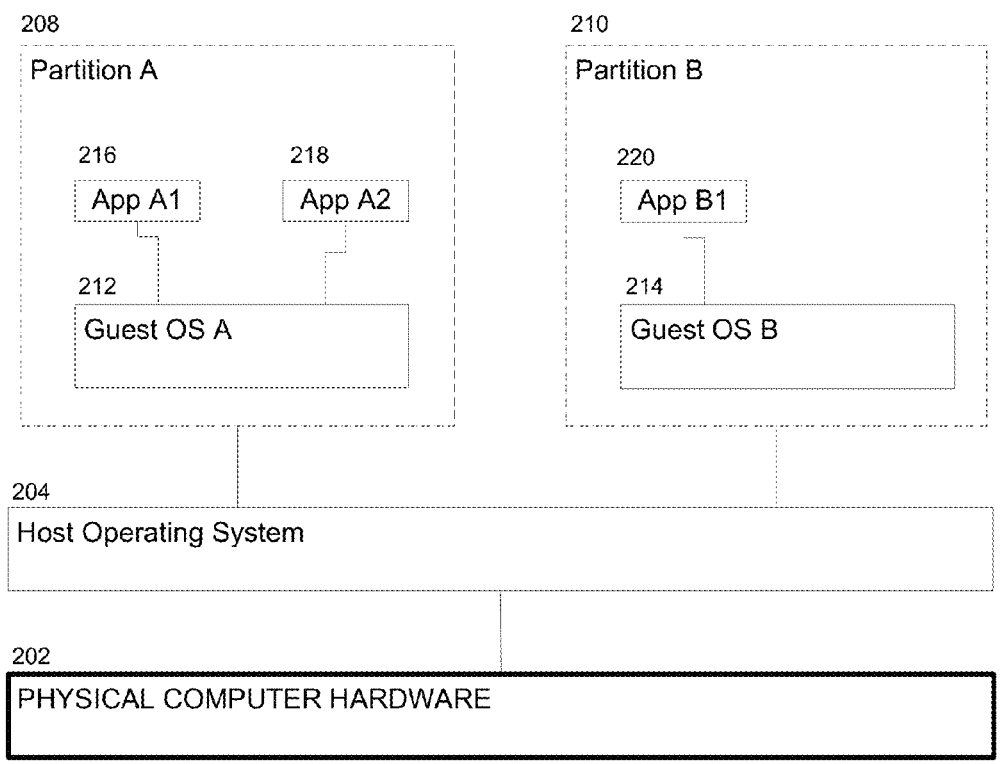
FIG. 2 illustrates an exemplary virtualized computing system.

Next, FIG. 2 illustrates a virtualized computing system comprising a host operating system (host OS) software layer 204 running directly above physical computer hardware 202, where the host OS 204 provides access to the resources of the physical computer hardware 202 by exposing interfaces to partitions A 208 and B 210 for the use by operating systems A and B, 212 and 214, respectively. This enables the host OS 204 to go unnoticed by operating system layers 212 and 214 running above it. Again, to perform the virtualization, the host OS 204 may be a specially designed operating system with native virtualization capabilities or, alternately, it may be a standard operating system with an incorporated hypervisor component for performing the virtualization (not shown).

Referring again to FIG. 2, above the host OS 204 are two partitions, partition A 208, which may be, for example, a virtualized Intel 386 processor, and partition B 210, which may be, for example, a virtualized version of one of the Motorola 680X0 family of processors. Within each partition 208 and 210 are guest operating systems (guest OSs) A 212 and B 214, respectively. Running on top of guest OS A 212 are two applications, application A1 216 and application A2 218, and running on top of guest OS B 214 is application B1 220.

In regard to FIG. 2, it is important to note that partition A 208 and partition B 210 (which are shown in dashed lines) are virtualized computer hardware representations that may exist only as software constructions. They are made possible due to the execution of specialized virtualization software(s) that not only presents partition A 208 and partition B 210 to Guest OS A 212 and Guest OS B 214, respectively, but which also performs all of the software steps necessary for Guest OS A 212 and Guest OS B 214 to indirectly interact with the real physical computer hardware 202.

Figure 3:
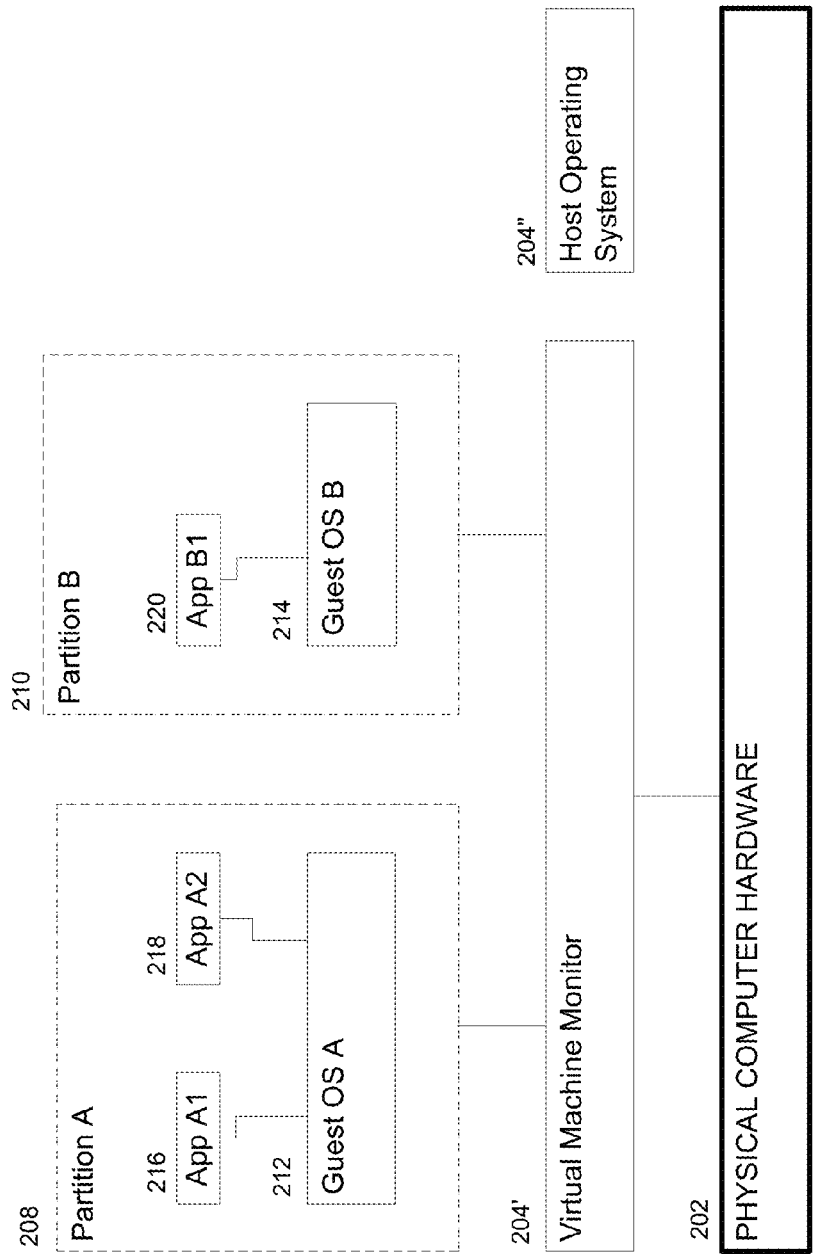
FIG. 3 illustrates an alternative virtualized computing system.

FIG. 3 illustrates an alternative virtualized computing system where the virtualization is performed by a virtual machine monitor (VMM) 204' running alongside the host operating system 204". In certain cases, the VMM 204' may be an application running above the host operating system 204" and interacting with the physical computer hardware 202 only through the host operating system 204". In other cases, as shown in FIG. 3, the VMM 204' may instead comprise a partially independent software system that on some levels interacts indirectly with the physical computer hardware 202 via the host operating system 204", but on other levels the VMM 204' interacts directly with the physical computer hardware 202 (similar to the way the host operating system interacts directly with the computer hardware). And yet in other cases, the VMM 204' may comprise a fully independent software system that on all levels interacts directly with the physical computer hardware 202 (similar to the way the host operating system interacts directly with the computer hardware) without utilizing the host operating system 204" (although still interacting with the host operating system 204" in order to coordinate use of the physical computer hardware 202 and avoid conflicts and the like).

Figure 4:
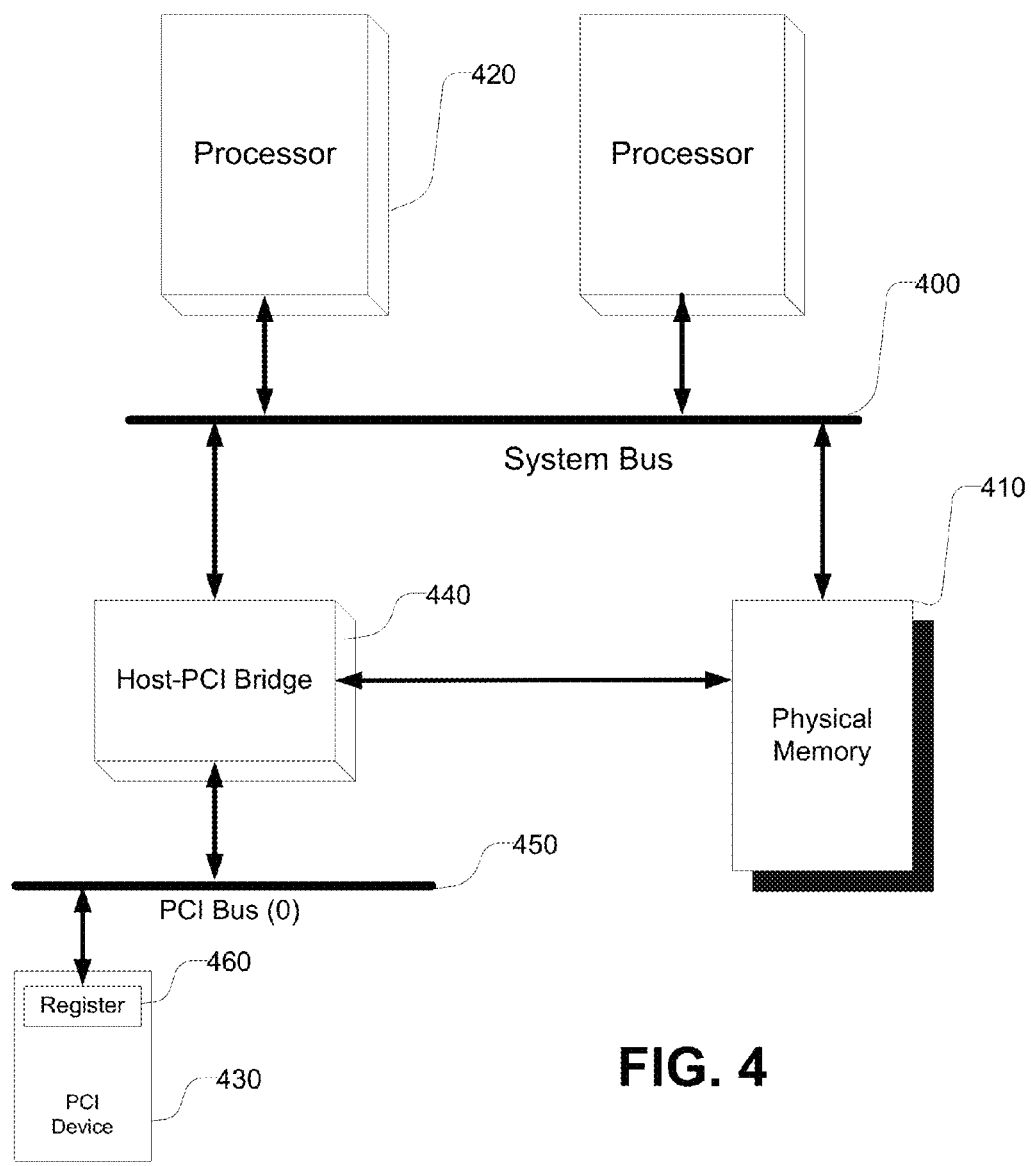
FIG. 4 depicts an exemplary system diagram illustrating IO space and MMIO as it relates to PCI devices.

FIG. 4 depicts an exemplary system diagram illustrating IO space and MMIO as it relates to PCI devices. The diagram include a system bus 400, physical memory 410, processor 420, a PCI device 430 with register 460, and a host-PCI bridge device 440. Attached to the host-PCI bridge device 440 is a PCI bus 450, and attached to the PCI bus is the PCI device 430. The PCI device 430 contains at least one register 460 at a memory location that must be read and written from the system processors in order to control the device. It can be seen that the physical memory address spaces may be distinct from the IO port space which may be a separate address space. IO resources may be translated into MMIO resources, which is one reason why IO port address space may be mapped via memory mapped IO port accesses.

Figure 5:
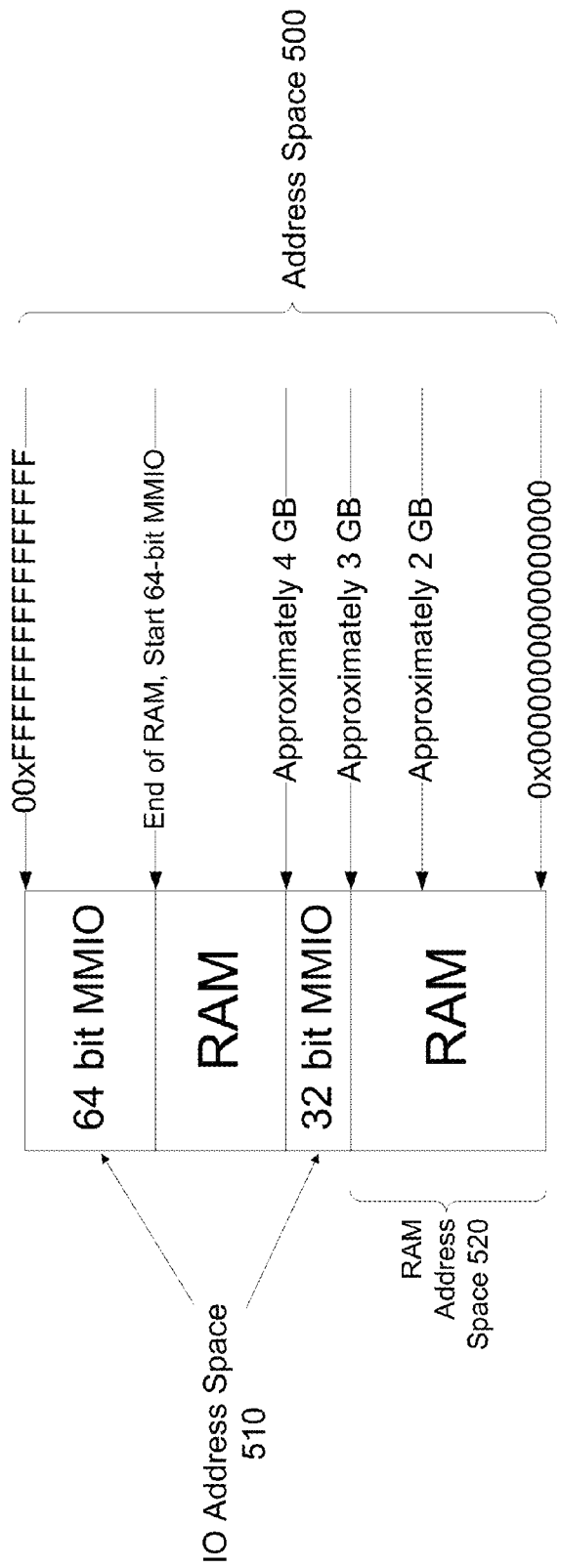

Referring to FIG. 5, shown is a diagram illustrating the address space 500 that RAM may reside in. As shown, memory mapped input/output (MMIO) areas 510 may also reside in the same address space. Typical modern address-space-based hardware control interfaces reside in the MMIO portion of this address space. System physical address space generally refers to the physical address space 500 of the physical computer system, as does "guest physical address space" which also refers to the "physical" address space 500 of a virtual computer system. The physical memory address space 500 is typically separate from the IO port space. The separate IO port space may be used to control older devices, and may be also be used to set up and configure newer devices since PCI configuration space is typically accessed via IO port space. Furthermore, IO port space addresses are typically 16 bits rather than 32 bits or 64 bits.

All of these variations for implementing the above mentioned partitions are just exemplary implementations, and nothing herein should be interpreted as limiting the disclosure to any particular virtualization aspect.

Configuration Space Virtualization

Most input/output (I/O) devices are designed with the assumption that there exists one piece of trusted software that configures all of the I/O devices in the system. It is also typically assumed that those I/O devices are ultimately controlled by device drivers that are plug-in modules that abstract individual device differences. Furthermore, it is assumed that these drivers are all contained within a single kernel.

However, in the context of virtual machines, the above assumptions may no longer be valid. Each virtual machine typically contains its own operating system kernel, which may or may not be trusted by all the other kernels running in all the other virtual machines. Configuring and controlling the devices within a machine typically involves some central authority that has the ability to enforce policies regarding how actions from one virtual machine may affect other virtual machines. In some systems, this central authority lies in a host operating system. In other systems the authority may lie in a hypervisor, and in yet others, the authority may lie with one of the virtual machines running on top of a hypervisor.

When building a virtualization system, one approach may be to maintain complete control of all I/O devices within the above described central authority. Thus when a virtual machine needs I/O services, the virtual machine may pass a request (directly or indirectly) to the central authority that controls the I/O. This approach may be acceptable but suffers from two problems. First, the I/O operates more slowly than it would compared an operating system running on physical hardware rather than a virtual machine. Second, the range of I/O devices expressed to the virtual machines may be limited by the virtualization software. It would be desirable to assign each of the devices within a physical computer to one or more of the virtual machines running within it. In this way, the I/O would not suffer the performance penalty associated with indirection. Furthermore, any device that can be plugged into the computer may be used by a virtual machine without requiring that the virtualization layers completely understand its internal functions.

For example, if a network interface controller (NIC) is plugged into a physical machine, it may be reasonable to assume that the virtualization software can control and manipulate the NIC. NICs are common and NIC vendors may desire to provide device driver software both for popular operating systems and for virtualization systems. On the other hand, if a more esoteric device is plugged into a computer, it is not likely that corresponding virtualization software will be available. Thus it would be desirable to allow a virtual machine to have direct access to the device even without any understanding of how the virtual machine will use the device.

Unfortunately, configuration and setup of the esoteric device may have system-wide consequences that may impact the function of other virtual machines. For example, turning the device on may cause an in-rush current spike which may cause the whole computer to brown-out if the in-rush occurs simultaneously with another in-rush spike. In another example, configuring the device may involve instructing the device to claim ranges of memory address space that may be occupied by other devices or main memory. As a final example, a device may be packaged in a chip with many other devices. In terms of the Peripheral Component Interconnect (PCI) specification, such devices are called "functions" and the chip is called a "package." The package may have one connection to the bus (or in the case of PCI Express, a connection to the fabric) and each function within the package may share some of the hardware associated with connecting to the rest of the system. In this case, configuration of the lowest numbered function (#0) can often have side effects visible in the operation of higher-numbered functions. If function 0 is under control of a virtual machine, other functions in the same package can be impacted by choices made in that virtual machine. This can cause other virtual machines to receive no service or poor service from the functions that are under the control of other machines.

In various embodiments disclosed herein, the behavior of a non-privileged virtual machine that interacts with a device may be bounded by creating a description of the device that indicates to a privileged authority (e.g., a hypervisor or other privileged aspect of a virtualization system) (1) which operations on the device may have system-wide effects and (2) which operations have effects local to the device. A non-privileged virtual machine refers to a virtual machine that does not own a system-wide policy for the system or the device. In other words, a non-privileged virtual machine is not the hypervisor or a parent/root/host OS. The privileged authority may then permit or deny these actions. The privileged authority may also translate these actions into other actions with benign consequences.

While it may be possible to implement some of the above methods by loading a device's driver into the context of the privileged authority, such an approach is typically not desirable because of the additional code required in the privileged authority. Minimizing the amount of code within the privileged authority is often important for making a virtualization system both secure and efficient.

Furthermore, when allowing an entire PCI function (rather than, for example, just one subset of a device) to be under the control of a non-privileged virtual machine, there may not exist any code within the privileged authority for sub-allocating the device's resources to many virtual machines. This sub-allocation process is common when sharing a device among many virtual machines. In contrast, the present disclosure describes methods for placing an entire discrete device under control of a virtual machine.

In an embodiment, each PCI (or PCI-X, or PCI-Express) device may implement two or three address spaces. The first address space may be described as memory-mapped I/O space and may behave similarly to RAM addressing. Reads and writes to a device may be performed like reads and writes to RAM but using different addresses. Referring to FIG. 5, RAM address space 520 may, for example, occupy the first 3 GB of memory address space with I/O devices occupying the address space 510 between 3 GB (address 3221225472) and 4 GB (address 4294967296.) MMIO address space may be used for moment-to-moment interaction with the device by the device driver. Access to MMIO address space is typically quick, and usually performed by the device driver (which is typically supplied by the device vendor) for the device. When the device is turned off, the device typically does not decode any MMIO space.

The second address space that may be implemented is the configuration space implemented by PCI devices. This configuration space may be populated with mechanisms (e.g., registers) for configuring the device. Such mechanisms may include turning the device off and on, assigning resources, and the like. The configuration space is typically decoded whether the device is turned on or off The PCI specification identifies the behaviors of some of the registers within this space. The registers allow a generic piece of configuration software (not supplied by the device vendor) to configure the device, assign resources to the device (such as an assigned range of MMIO space addresses), and turn the device on. Configuration space can and usually does contain device-specific registers without the meaning defined by the PCI specification. Such registers can typically only be manipulated by the device driver for the device. Lastly, new features may be added to the PCI specification by defining new ranges in configuration space called "capability structures."

The third address space that a PCI device might use is called "I/O" space and is mostly historical. Generally I/O space has the properties of MMIO space.

A privileged authority such as a hypervisor or other virtualization intermediary may need to decide which parts of the configuration space can be placed under the control of a non-privileged virtual machine. In the embodiments disclosed below, a hypervisor will be described as the privileged authority. However, it should be readily apparent to those skilled in the art that the disclosed embodiments may be implemented in connection with any other virtualization intermediary.

The hypervisor may further attempt to contain the parts of MMIO and I/O space that the non-privileged virtual machine can access. In various embodiments the present disclosure describes methods for containing the behavior of the non-privileged virtual machine. In an embodiment, for each device a map of the configuration space may be constructed, wherein each bit within the map has one or more of the following properties:

i. Read-only.
 ii. Always-0 on read.
 iii. Always-1 on read.
 iv. Read-write.
 v. Write of 1 clears, write of 0 leaves alone.
 vi. Write of 1 sets, write of 0 leaves alone.
 vii. Write of 0 clears, write of 1 leaves alone.
 viii. Write of 0 sets, write of 1 leaves alone.
 ix. Clear to 0 after first read.
 x. Set to 1 after first read.

The above behaviors are exemplary, and additional behaviors may be included to bound the actions allowed on memory locations. Behaviors may also be mapped to memory locations at higher levels of granularity such as bytes or larger segments of memory such as pages.

A map of MMIO space may be constructed, wherein each page may either be mapped into the virtual machine or not mapped into the virtual machine. The map may be constructed with page granularity rather than with bit granularity. If bit granularity is used, there may be potentially numerous bits of MMIO space, the result being that the map may become unreasonably large. Furthermore, processors typically give the hypervisor the ability to intercept only on page granularity, so constructing a bit-level map would imply that the hypervisor would have to intercept every MMIO operation and apply the proper filter implied by the map. Such constant interference with the operation of the device would likely have a negative impact on device operation.

Some devices may map registers from their configuration spaces a second time into their I/O or MMIO spaces. This may be done because access to configuration space is typically slow and it may be convenient to provide access to a register before the device is configured, in which case the mapping should be in configuration space. Access to the register should also be provided later at runtime via a lightweight path to the register, in which case the mapping should also be in memory space. Accordingly, one of the behaviors for a page of MMIO space is that the page may be configured as an alias of configuration space, wherein any access to the page should be trapped and redirected to the code that handles configuration space. In addition to mapping an entire page in this manner, individual bits within a page may be marked as aliases of specific bits within configuration space.

For a page that is excluded from the virtual machine's map, the hypervisor may choose to populate the excluded page with a static image that appears like the device. Alternatively, the hypervisor may choose to accept intercepts and handle the intercepts like configuration space with a map applied for these specific pages. In other words, a map of MMIO space may have two levels. One level may be for the list of pages of the device MMIO space that are mapped into the virtual machine. The second level map may optionally define the bits within the excluded pages.

I/O space for the device may be treated like configuration space. Alternatively, the I/O space may be excluded from the virtual machine.

As discussed above, the various disclosed embodiments may allow an authority such as a hypervisor to safely contain a device for which it is not employing a device driver. It is thus possible that the hypervisor does not have the information to populate such a map. Therefore, a way to obtain this information from the device vendor is needed. In an embodiment, a representation of the maps which can be embedded in a driver installation file may be created. In one embodiment the driver installation file may be called an INF. INFs may be contained within driver installation packages. The INFs may further be digitally signed by the entity that produces the packages. Accordingly, a machine administrator may decide to allow the hypervisor to process the INF supplied by the device manufacturer without actually installing a driver for the device. The driver may then be installed in the virtual machine and the device may become functional in the virtual machine and contained so that the driver does not affect other virtual machines or the hypervisor itself.

The presently disclosed aspects can be implemented as systems, methods, computer executable instructions residing in computer readable media, and so on. Thus, any disclosure of any particular system, method, or computer readable medium is not confined there to, but rather extends to other ways of implementing the disclosed subject matter.

Figure 6:
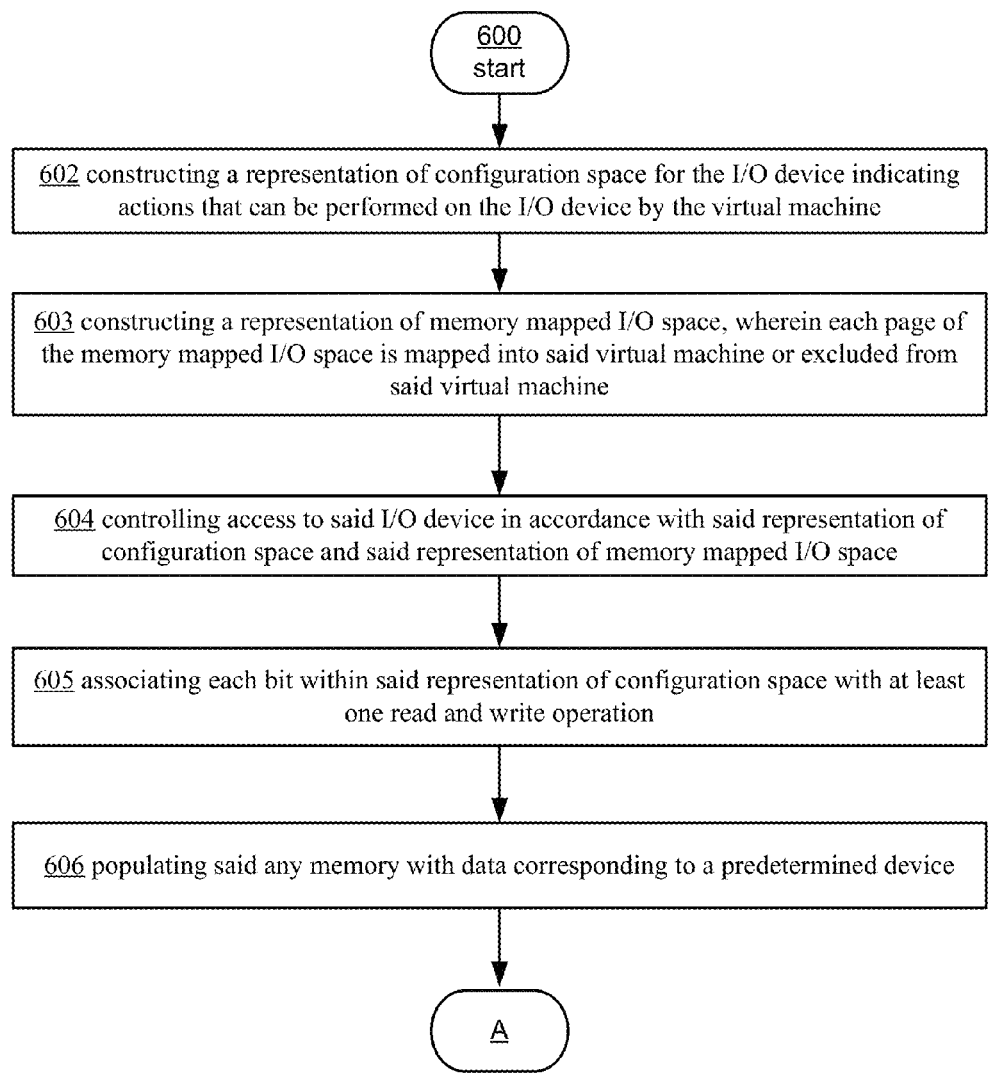
FIG. 6 illustrates an example of an operational procedure for managing the global and local effects of transactions between a non-privileged virtual machine and an I/O device.
Figure 7:
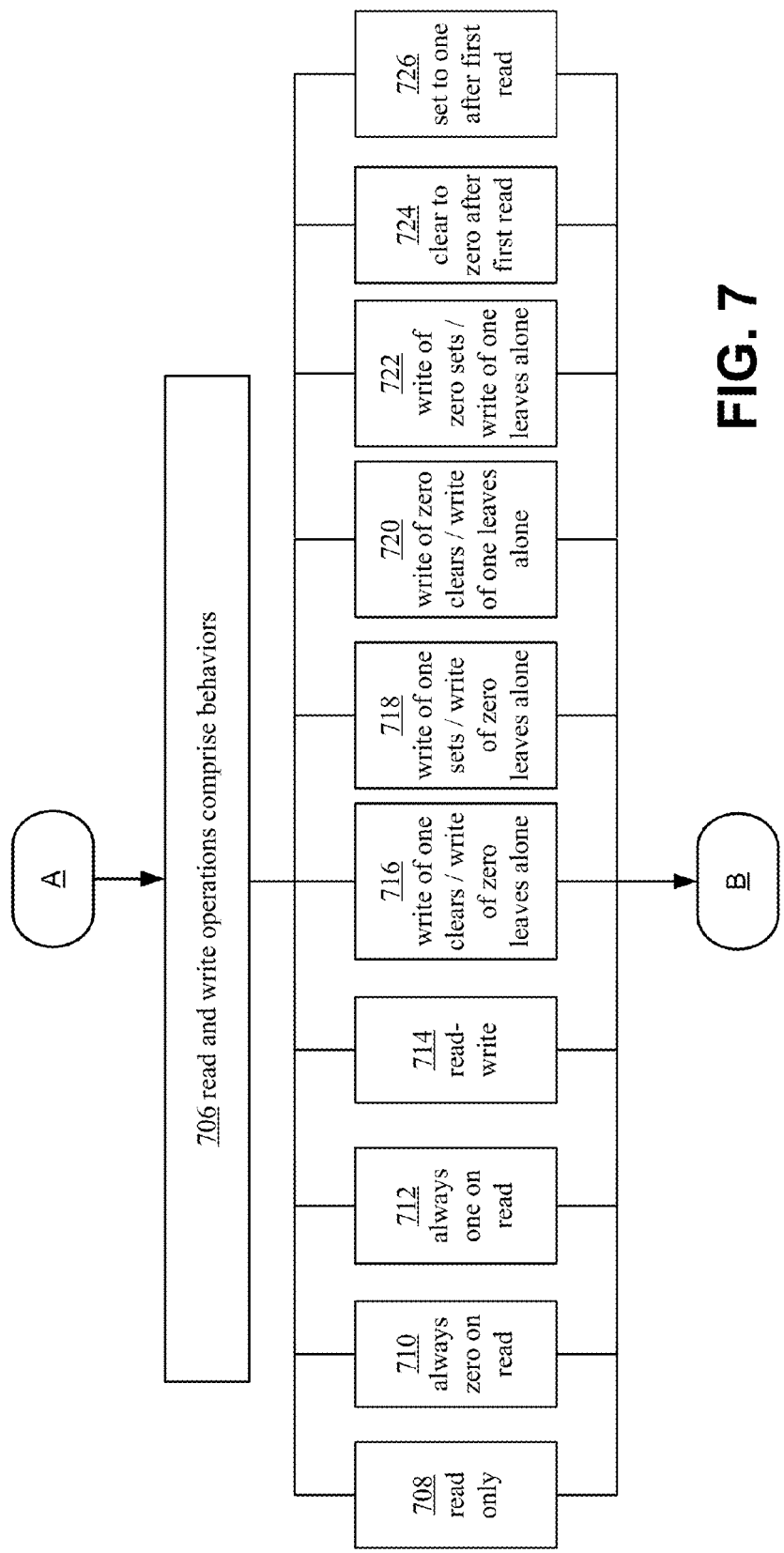
FIG. 7 illustrates an example of an operational procedure for managing the global and local effects of transactions between a non-privileged virtual machine and an I/O device.
Figure 8:
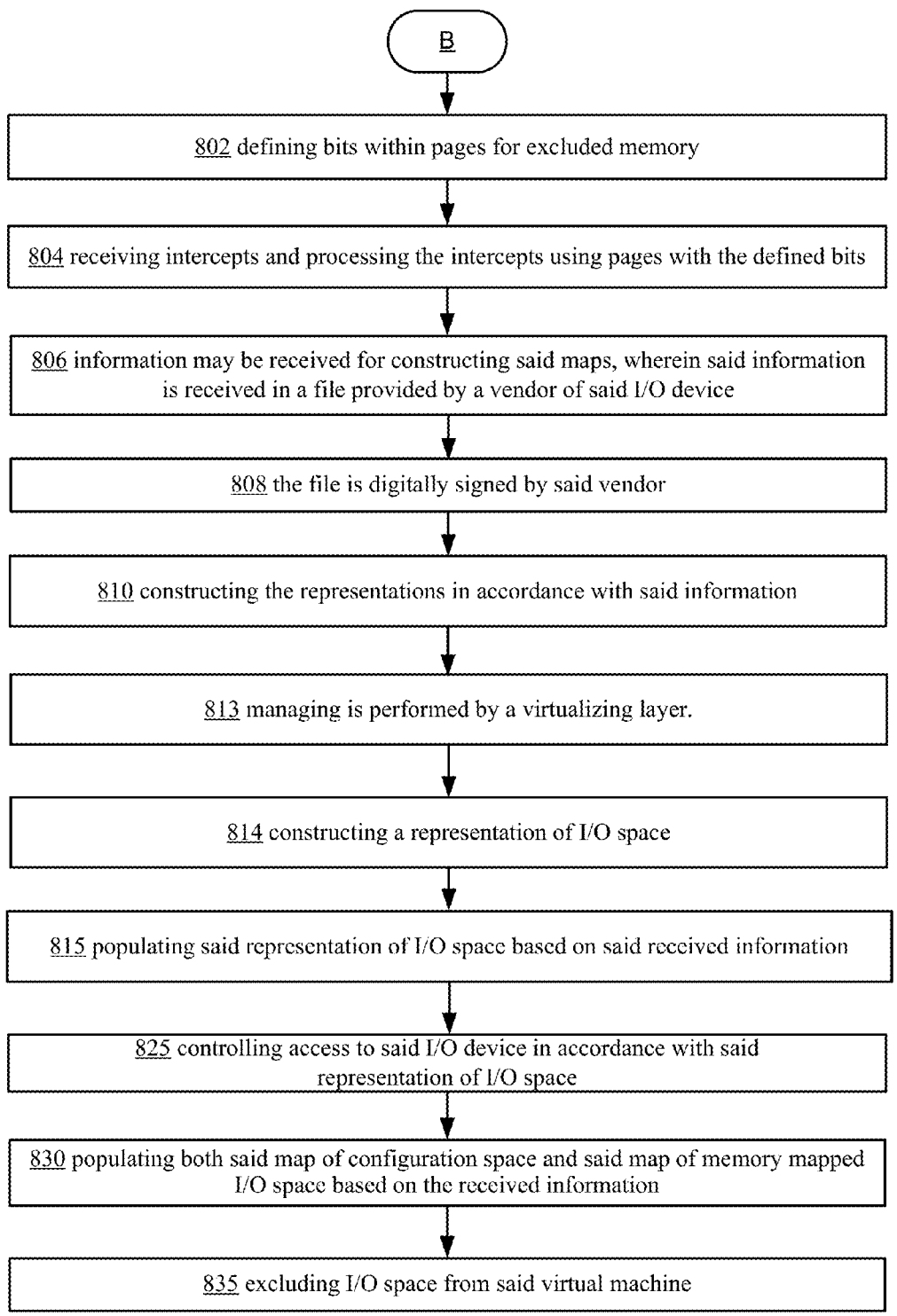
FIG. 8 illustrates an example of an operational procedure for managing the global and local effects of a non-privileged virtual machine that interacts with a device.

FIGS. 6 through 8 depict an example of an operational procedure for managing communications between a virtual machine and an I/O device. The procedure may include operations 600, 602, 603, 604, 605 and 606. Referring to FIG. 6, operation 600 begins the operational procedure and in operation 602 a representation of configuration space may be constructed for the I/O device indicating actions that can be performed on the I/O device by the virtual machine. This configuration space may be populated with mechanisms (e.g., registers) for configuring the device. A representation of memory mapped I/O space may be constructed 603 wherein each page of the memory mapped I/O space is mapped into the virtual machine or excluded from the virtual machine. Operation 604 illustrates controlling access to said I/O device in accordance with said representation of configuration space and said representation of memory mapped I/O space. Operation 605 illustrates that said constructing a representation of configuration space further comprises associating each bit within said representation of configuration space with at least one read and write operation. Operation 606 illustrates that for any memory excluded from said representation of configuration space or for any memory excluded from said representation of memory mapped I/O space, populating said any memory with data representative of said I/O device. For a page that is excluded from the virtual machine's map, for example, the hypervisor may choose to populate the excluded page with a static image that appears like the device.

Referring to FIG. 7, operation 706 illustrates that the read and write operations comprise: read only 708, always 0 on read 710, always 1 on read 712, read-write 714, write of 1 clears/write of 0 leaves alone 716, write of 1 sets/write of 0 leaves alone 718, write of 0 clears/write of 1 leaves alone 720, write of 0 sets/write of 1 leaves alone 722, clear to 0 after first read 724, or set to one after first read 726.

Referring to FIG. 8, operation 802 illustrates defining bits within pages for the excluded memory. Operation 804 illustrates receiving intercepts and processing the intercepts using pages with defined bits. For example, the hypervisor may choose to accept intercepts and handle the intercepts like configuration space with a map applied for these specific pages. In one embodiment, operation 806 illustrates that information may be received for constructing said maps, wherein said information is received in a file provided by a vendor of said I/O device. In another embodiment, operation 808 illustrates that the file is digitally signed by said vendor. Operation 810 illustrates constructing the representations in accordance the information received from the vendor.

Operation 813 illustrates that the managing may be performed by a virtualizing layer using the pages with defined bits. A driver may be installed in the virtual machine and the device may become functional in the virtual machine and contained so that the driver does not affect other virtual machines or the hypervisor itself.

In operation 814 a representation of I/O space is constructed. Operation 815 illustrates populating the representation of I/O space based on the received information. Operation 825 illustrates controlling access to said I/O device in accordance with the representation of I/O space. Operation 830 illustrates populating both said map of configuration space and said map of memory mapped I/O space based on the received information. I/O space from the virtual machine may be excluded in operation 835.

Figure 9:
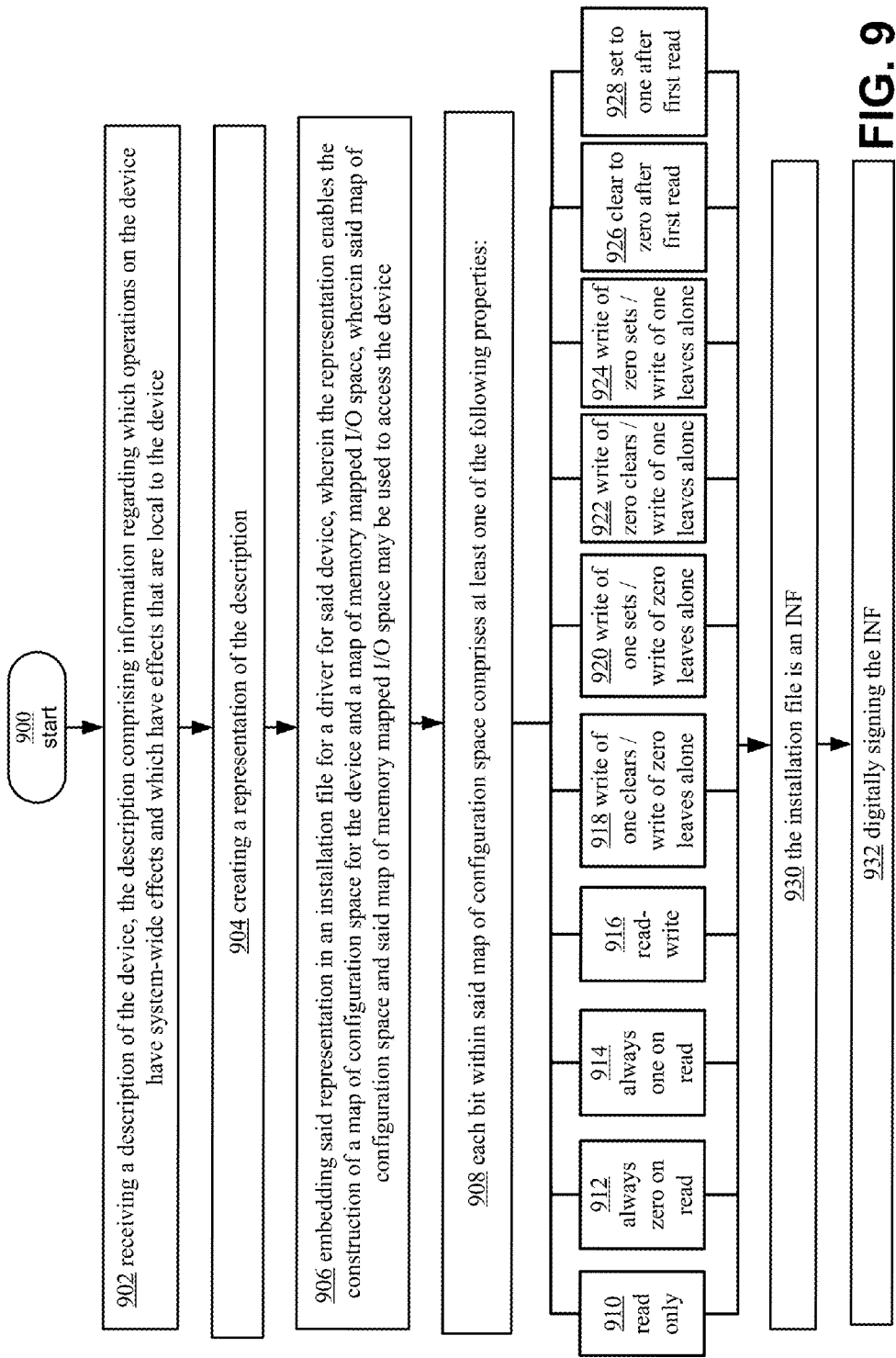
FIG. 9 depicts an exemplary operational procedure for bounding the behavior of a non-privileged virtual machine that interacts with a device.

FIG. 9 depicts an exemplary operational procedure for managing communications between a virtual machine and a device including operations 900, 902, 904, 906, 908, 910, 912, and 914. Referring to FIG. 9, operation 900 begins the operational procedure and operation 902 illustrates receiving a description of the device, the description comprising information regarding which operations on the device have system-wide effects and which have effects that are local to the device. Operation 904 illustrates creating a representation of the description. Operation 906 illustrates embedding the representation in an installation file for a driver for the device, wherein the representation enables the construction of a map of configuration space for the device and a map of memory mapped I/O space, wherein the map of configuration space and the map of memory mapped I/O space may be used to access the device.

Operation 908 illustrates that each bit within said map or page associated with the map of configuration space and map of memory mapped I/O space comprises at least one of the following properties: read only 910, always 0 on read 912, always 1 on read 914, read-write 916, write of 1 clears/write of 0 leaves alone 918, write of 1 sets/write of 0 leaves alone 920, write of 0 clears/write of 1 leaves alone 922, write of 0 sets/write of 1 leaves alone 924, clear to 0 after first read 926, or set to 1 after first read 928. Operation 930 illustrates that the installation file is an INF, and operation 932 illustrates digitally signing the INF.

Figure 10:
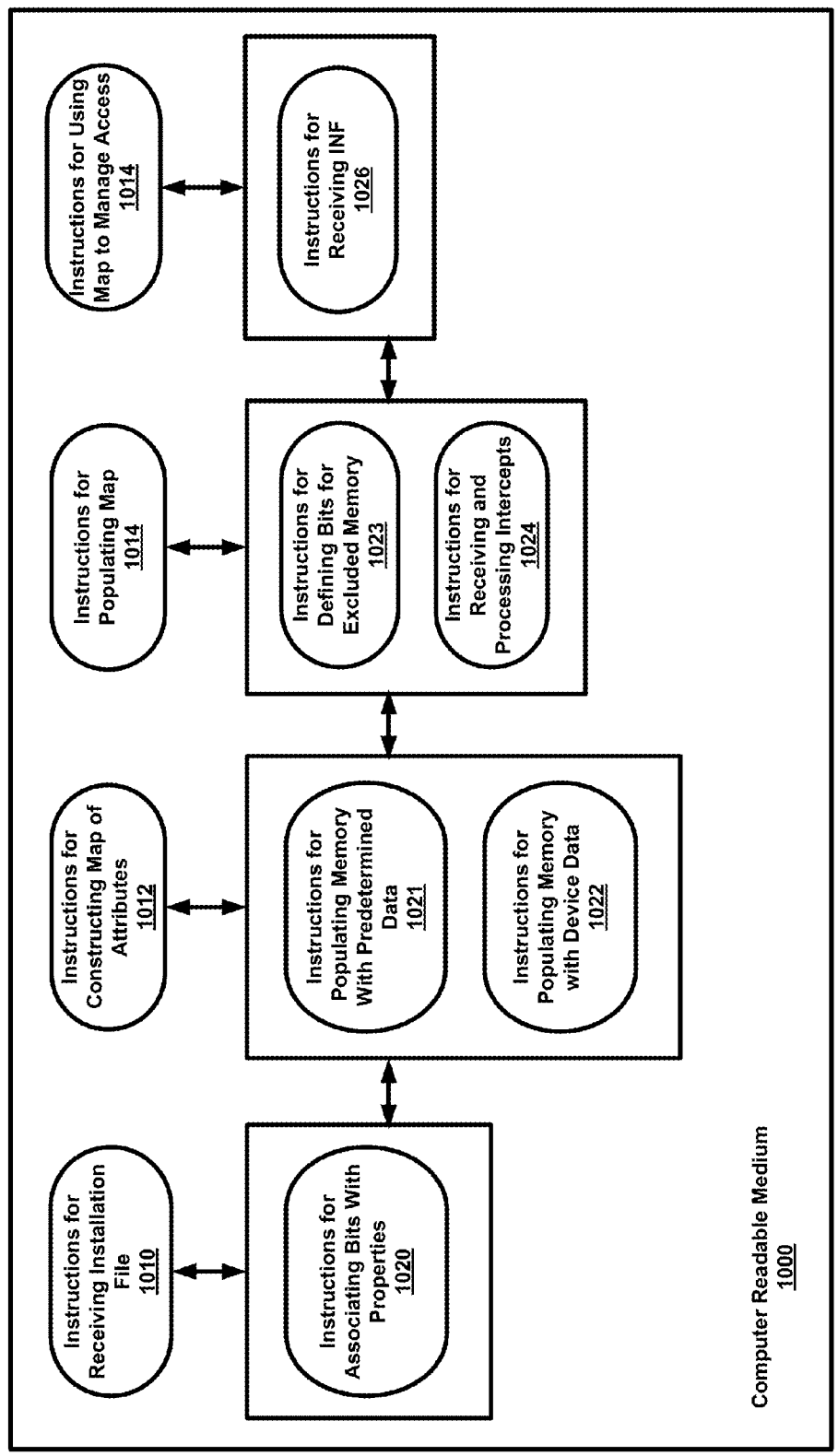
FIG. 10 illustrates a computer readable medium bearing computer executable instructions discussed with respect to FIGS. 1-9, above.

Any of the above mentioned aspects can be implemented in methods, systems, computer readable media, or any type of manufacture. For example, per FIG. 10, a computer readable medium can store thereon computer executable instructions for controlling access to a PCI, PCI-X or PCI-Express device wherein the device is communicatively coupled to a physical machine that hosts virtual machines. Such media can comprise a first subset of instructions for receiving an installation file for the device, wherein the installation file comprises information regarding which operations on the device have system-wide effects and which have effects that are local to the device 1010; a second subset of instructions for constructing at least one map of attributes for configuration space, memory mapped I/O space and I/O space for the device, wherein each page or each bit associated with the at least one map is mapped into the virtual machine and wherein a static page of bits can be presented in a virtual machine as the state of the device 1012; a third subset of instructions for populating the at least one map based on said received installation file 1014, and a fourth set of instructions for using the at least one map to manage access to the device 1016. It will be appreciated by those skilled in the art that additional sets of instructions can be used to capture the various other aspects disclosed herein, and that the three presently disclosed subsets of instructions can vary in detail per the present disclosure.

For example, the instructions can further comprise instructions 1020 wherein each bit within said map or page associated with the at least one map contains one of the following properties: always 0 on read, always 1 on read, read-write, write of 1 clears/write of 0 leaves alone, write of 1 sets/write of 0 leaves alone, write of 0 clears/write of 1 leaves alone, write of 0 sets/write of 1 leaves alone, clear to 0 after first read, or set to 1 after first read.

Again, by way of example, the instructions can further comprise instructions for: populating said any memory with predetermined data for any memory excluded from the map of configuration space or for any memory excluded from the map of memory mapped I/O space 1021; the predetermined data corresponds to a predetermined device 1022; defining bits within pages for the excluded memory 1023; receiving intercepts and processing the intercepts using the pages with defined bits 1024; and the installation file is an INF provided by a vendor of the device and may optionally be digitally signed 1026.

Figure 1C:
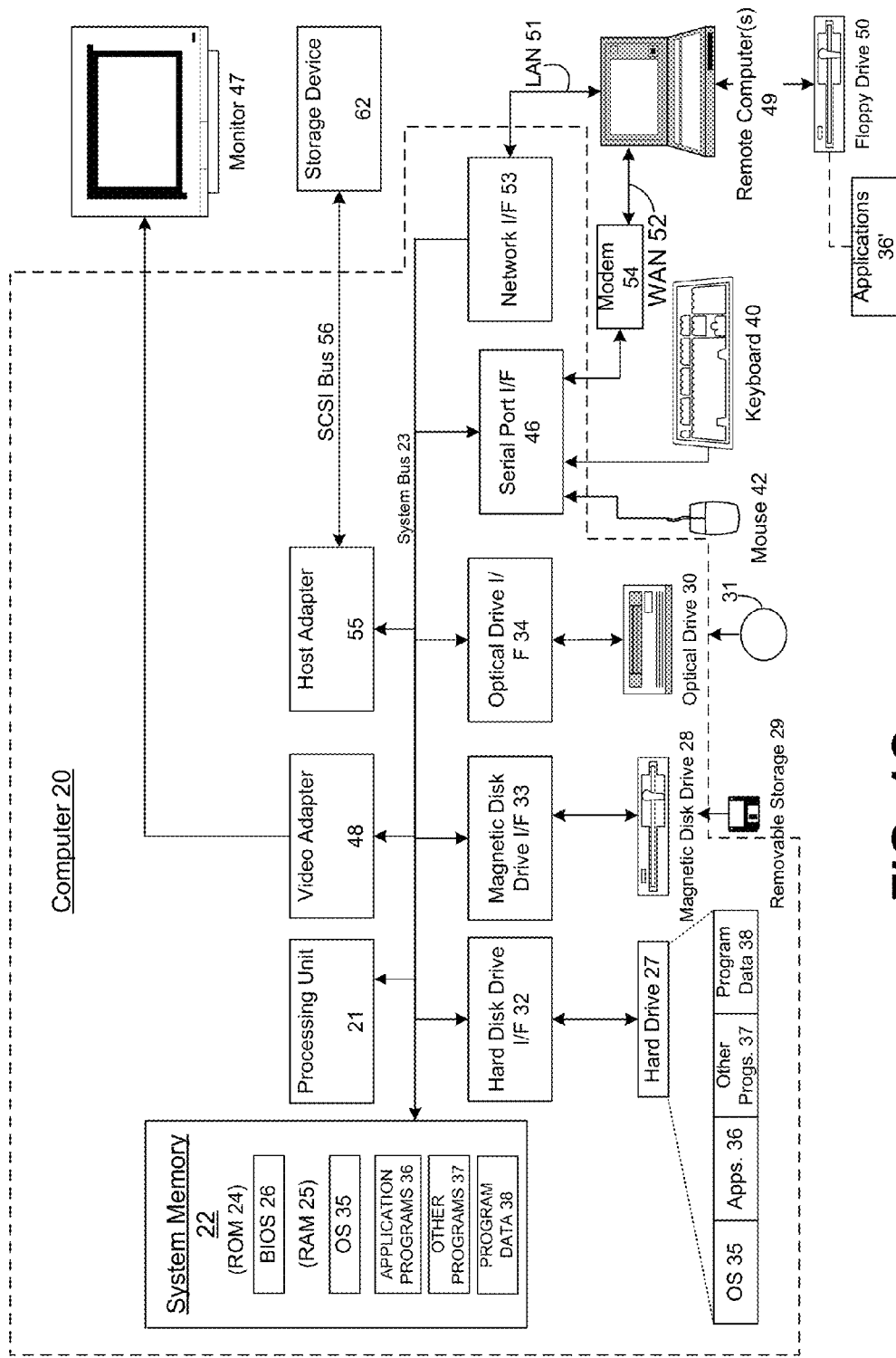
FIG. 1C depicts an example computer system wherein aspects of the present disclosure can be implemented.

As described above, aspects of the invention may execute on a programmed computer. FIG. 1C and the following discussion is intended to provide a brief description of a suitable computing environment in which the those aspects may be implemented. One skilled in the art can appreciate that the computer system of FIG. 1C can in some embodiments effectuate various aspects of FIGS. 1A and 1B. In these example embodiments, the server and client can include some or all of the components described in FIG. 1C and in some embodiments the server and client can each include circuitry configured to instantiate specific aspects of the present disclosure.

The term circuitry used through the disclosure can include specialized hardware components. In the same or other embodiments circuitry can include microprocessors configured to perform function(s) by firmware or switches. In the same or other example embodiments circuitry can include one or more general purpose processing units and/or multi-core processing units, etc., that can be configured when software instructions that embody logic operable to perform function(s) are loaded into memory, e.g., RAM and/or virtual memory. In example embodiments where circuitry includes a combination of hardware and software, an implementer may write source code embodying logic and the source code can be compiled into machine readable code that can be processed by the general purpose processing unit(s).

FIG. 1C depicts an example of a computing system which is configured to with aspects of the disclosure. The computing system can include a computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments, computer executable instructions embodying aspects of the invention may be stored in ROM 24, hard disk (not shown), RAM 25, removable magnetic disk 29, optical disk 31, and/or a cache of processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non-volatile storage of computer readable instructions, data structures, program modules and other data for the computer 20. Although the environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1C. The logical connections depicted in FIG. 1C can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are examples and other means of establishing a communications link between the computers may be used. Moreover, while it is envisioned that numerous embodiments of the invention are particularly well-suited for computer systems, nothing in this document is intended to limit the disclosure to such embodiments.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

Lastly, while the present disclosure has been described in connection with the preferred aspects, as illustrated in the various figures, it is understood that other similar aspects may be used or modifications and additions may be made to the described aspects for performing the same function of the present disclosure without deviating therefrom. For example, in various aspects of the disclosure, various mechanisms were disclosed for bounding the behavior of a non-privileged virtual machine that interacts with a device. However, other equivalent mechanisms to these described aspects are also contemplated by the teachings herein. Therefore, the present disclosure should not be limited to any single aspect, but rather construed in breadth and scope in accordance with the appended claims.

What is claimed:

1. A computer implemented method for installing and operating an I/O device on a virtual machine, comprising:
   receiving a description of the I/O device;
   constructing a first representation of configuration space for the I/O device, the first representation indicative of which portions of the configuration space can be placed under control of a non-privileged authority, wherein the first representation is constructed based at least in part on said description;
   constructing a second representation of memory mapped I/O (MMIO) space and configuration space, the second representation indicative of pages to be included or excluded in the virtual machine, wherein the second representation is constructed based at least in part on said description;
   determining which operations have effects that impact functionality of other virtual machines;
   based on said determining, constructing a map comprising information indicative of an association between a memory location and information indicative of a translation from a first operation on the memory location to a second operation on the memory location, wherein the second operation has benign consequences on functionality of other virtual machines; and
   controlling access to said I/O device based on said map and said first and second representations.

2. The computer implemented method according to claim 1, wherein said constructing a first representation further comprises associating bits within said first representation with at least one read and write operation.

3. The computer implemented method according to claim 1, wherein for memory excluded from said first representation or for memory excluded from said second representation, populating the memory with data representative of said I/O device.

4. The computer implemented method according to claim 1, wherein said translation comprises at least one of: read-only, always zero on read, always one on read, read-write, write of one clears/write of zero leaves alone, write of one sets/write of zero leaves alone, write of zero clears/write of one leaves alone, write of zero sets/write of one leaves alone, clear to zero after first read, or set to one after first read.

5. The computer implemented method according to claim 3, further comprising:
   defining bits within pages for the excluded memory, wherein said controlling access comprises using pages with the defined bits.

6. The computer implemented method according to claim 1, wherein the description of the I/O device is indicative of the association between the memory location and the information indicative of the translation.

7. The computer implemented method according to claim 1, wherein said controlling is performed by a virtualizing layer.

8. The computer implemented method according to claim 6, further comprising:
   constructing a third representation of I/O space;
   populating said third representation of I/O space based on said description; and
   controlling access to said I/O device in accordance with said third representation.

9. The computer implemented method according to claim 6, further comprising populating said first or second representations with static data indicative of a state of the device, based on the received description.

10. The computer implemented method according to claim 1, further comprising excluding I/O space from said virtual machine.

11. A system for managing communications between a virtual machine and a device, comprising:
    at least one processor; and
    at least one memory communicatively coupled to said at least one processor, the memory having stored therein computer-executable instructions that, when executed on the processor, cause the processor to perform operations comprising:
    receiving a description of the device;

constructing a representation of configuration space for the device, the representation of configuration space indicative of which parts of the configuration space can be placed under control of a non-privileged authority, wherein the representation of configuration space is constructed based at least in part on said description;

constructing a representation of memory mapped I/O (MMIO) space and configuration space, the representation of MMIO space and configuration space indicative of pages to be included or excluded in the virtual machine, wherein the representation of MMIO space and configuration space is constructed based at least in part on said description;

populating excluded pages with data representative of the device;

constructing a map comprising indications of operations on memory locations that, when requested by the non-privileged authority, are replaced by different operations on the memory locations; and controlling access to said device based on said map and said representations of MMIO space and configuration space.

12. The system of claim 11 wherein bits within said representation of configuration space comprises at least one of: read-only, always zero on read, always one on read, read-write, write of one clears/write of zero leaves alone, write of one sets/write of zero leaves alone, write of zero clears/write of one leaves alone, write of zero sets/write of one leaves alone, clear to zero after first read, or set to one after first read.

13. The system according to claim 11, wherein the description is indicative of the operations that are to be replaced and the description is received via an installation file.

14. A computer readable storage device storing thereon computer executable instructions for controlling access to a device communicatively coupled to a physical machine that hosts virtual machines, comprising instructions for:

receiving a description of the device;

constructing a representation of memory mapped I/O (MMIO) space and configuration space, the representation of MMIO space and configuration space indicative of pages to be included, excluded, or pre-populated in the virtual machine, wherein the representation of MMIO space and configuration space is constructed based at least in part on said description;

constructing a representation of configuration space comprising an association between at least one memory location within the configuration space to one or more translations from a first operation on the at least one memory location to a second operation on the at least one memory location, wherein the representation of configuration space is constructed based at least in part on said description; and controlling access to said device based on said representation of MMIO space and configuration space and said representation of configuration space.

15. The computer readable storage device of claim 14, wherein bits within said map or a page associated with the map contains at least one of: read-only, always zero on read, always one on read, read-write, write of one clears/write of zero leaves alone, write of one sets/write of zero leaves alone, write of zero clears/write of one leaves alone, write of zero sets/write of one leaves alone, clear to zero after first read, or set to one after first read.

16. The computer readable storage device of claim 14, wherein for memory excluded from said representation of configuration space or for memory excluded from said representation of MMIO space, populating said memory with predetermined data.

17. The computer readable storage device of claim 16, wherein said predetermined data corresponds to a predetermined device.

18. The computer readable storage device of claim 16, further comprising instructions for:

defining bits within pages for the excluded memory, wherein said controlling comprises using pages with the defined bits.

19. The computer readable storage device of claim 14, wherein the description is indicative of associations between memory locations and actions operable on said memory locations and the description is received via an installation file provided by a vendor of said device.

* * * * *